United States Patent Office 2,908,691
Patented Oct. 13, 1959

2,908,691

HYDROXYPHENALKYLAMINOALKYLINDOLES AND ETHERS CORRESPONDING THERETO

Richard A. Robinson, Evanston, Ill., assignor to G. D. Searle & Co., Chicago, Ill., a corporation of Delaware No Drawing. Application July 14, 1958
Serial No. 748,545

9 Claims. (Cl. 260—319)

This invention relates to hydroxyphenalkylaminoalkylindoles, and ethers corresponding thereto. More particularly, this invention relates to products of the formula

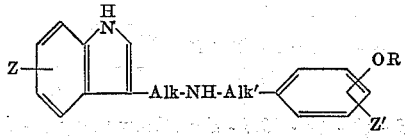

wherein Z and Z' are each hydrogen or an optionally-etherified hydroxyl radical, Alk is an alkylene or hydroxyalkylene radical, and R is hydrogen or an etherifying moiety.

The substituent ether groupings referred to by Z, Z', and OR in the foregoing formula are preferably hydrocarbonoxy radicals, either saturated or aromatic, which contain fewer than 9 carbon atoms. Examples of such radicals are lower alkoxy groupings —O-lower alkyl as also cyclopentyloxy, cyclohexyloxy, and benzyl radicals. Those skilled in the art will appreciate that lower alkyl radicals include methyl, ethyl, propyl, isopropyl, butyl, isobutyl, sec-butyl, tert-butyl, pentyl, tert-pentyl, neopentyl hexyl, isohexyl, heptyl, octyl, and like $C_nH_{2n+1}$ groupings wherein $n$ is a positive integer amounting to not more than 8.

The alkylene radicals called for by Alk in the generic formula for compounds of this invention are desirably those comprising more than 1 and less than 5 carbon atoms, illustratively, 1,2-ethylene (—CH₂CH₂—)

Trimethylene (—CH₂CH₂CH₂—)

1,2-propylene (—CH₂CHCH₃)

Tetramethylene (—CH₂CH₂CH₂CH₂—)

2-methyl-1,2-propylene (—CH₂CCH₃)
                                       |
                                       CH₃ and like bivalent, saturated, acyclic, straight- or branched-chain, hydrocarbon groupings. The alkylene radicals comprehended by Alk' differ, as a class, only in being made up of fewer than 4 carbon atoms, while the hydroxyalkylene radicals embraced by Alk' are $C_2$–$C_4$ alkylene groupings wherein at least 1 hydrogen is replaced by hydroxyl.

The application for Letters Patent securing the invention herein described and claimed is a continuation-in-part of applicant's prior copending application, Serial No. 610,898, filed September 20, 1956, now abandoned.

Equivalent to the foregoing basic amines for the purposes here described are non-toxic acid addition salts thereof, the composition of which may be symbolized by

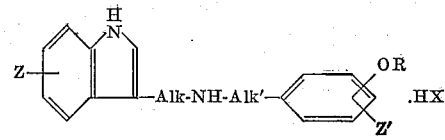

wherein Z, Z', Alk, Alk', and R have the meanings hereinbefore assigned, and X is one equivalent of an anion—for example, chloride, bromide, iodide, nitrate, phosphate, sulfate, sulfamate, methyl sulfate, ethyl sulfate, benzenesulfonate toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage.

The compounds of this invention display a useful range of pharmacological properties. They are, specifically, anti-secretory agents, effective in reducing gastric acidity. In addition, they exhibit valuable effects on the central nervous system, being possessed of anti-emetic properties and a capacity to potentiate the action of barbiturates in maintaining a state of hypnosis.

Manufacture of the claimed compositions proceeds by reductive amination of a carbonyl compound of the formula

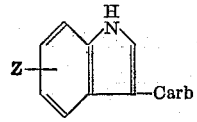

with an amine of the formula

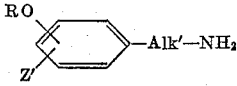

in a solvent such as a lower alkanol, the terms Z, Z', Alk', and R being defined as above and Carb being identical with Alk except that 1 oxygen replaces 2 hydrogens on the carbon thereof which attaches to nitrogen. This reaction is carried out, for example, by shaking a solution of the carbonyl compound and the phenolic amine in methanol in the presence of a hydrogen atmosphere and a hydrogenation catalyst, suitably a noble metal catalyst such as platinum oxide. The reaction can also be carried out stepwise by first forming the condensation product of the carbonyl compound and the phenolic amine and then conducting the hydrogenation as a separate operation.

The reductive aminations herein described are satisfactorily effected at room temperatures under approximately 1 to 5 atmospheres of hydrogen pressure. As is well known in the art, a hydrogenation reaction sometimes exhibits irregular behavior in starting because of such factors as impurities in the solvents or reagents, the presence of catalyst poisons, variations in activity of particular batches of catalysts, etc. Accordingly, while typical reaction times under normal conditions have been included in many of the examples hereinafter, the period of time required for completion of the reaction is more accurately determined by measuring the consumption of hydrogen rather than by conducting the reduction for an arbitrary period of time. In the reductive aminations described herein there is consumed a total of approximately 1 molecular equivalent of hydrogen for each molecular equivalent of either the amine or the carbonyl compound when these 2 reactants are employed in approximately stoichiometrically equivalent quantities. When the catalyst used is platinum oxide, there is also consumed about 2 molecular equivalents of hydrogen for each molecular equivalent of platinum oxide. The noble metal catalyst can also be formed in a separate operation, as in the preparation of a catalyst comprising palladium on an inert carrier.

An alternative method for the manufacture of compounds of this invention consists in subjecting a carbonyl compound of the formula

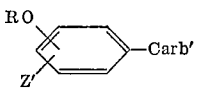

to reductive amination with an amine of the formula

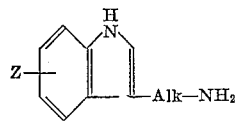

in accordance with the techniques previously described, Z, Z', Alk, and R having the same meanings as before, and Carb' being identical with Alk' except that 1 oxygen replaces 2 hydrogens on the carbon thereof which attaches to nitrogen.

Still another means of producing the compositions of this invention, and 1 wherein hydrogenation plays no part, is the condensation of a halogen derivative of the type

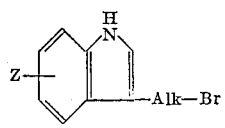

with an amine of the formula

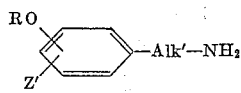

Z, Z', Alk, Alk', and R being as before.

The products which have free phenolic hydroxyls can also be obtained by the cleavage of the corresponding alkyl ethers with pyridine hydrochloride, or by catalytic hydrogenation of the corresponding benzyl ethers. The latter operation is particularly useful for the conversion of compounds of the invention wherein Z is a benzyloxy substituent to those wherein Z is OH.

Conversion of the amine bases of this invention to corresponding acid addition salts is accomplished by simple admixture of these compounds with 1 equivalent of any of various inorganic and strong organic acids, the anionic portion of which conforms to X as hereinbefore defined.

The following examples described in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of material in parts by weight, except as otherwise noted.

Example 1

(A) *3 - {2 - [2 - (3,4 - dimethoxyphenyl) - 1 - (methyl) - ethylamino]ethyl}indole oxalate.*—Activated charcoal is digested in dilute aqueous nitric acid and then washed consecutively with water and ethanol. A suspension of 6 parts of this charcoal in a solution of 2 parts of palladium chloride in 1000 parts of aqueous 50% methanol containing a small amount of hydrochloric acid is agitated under a hydrogen atmosphere at approximately 25° until hydrogenation is complete. The resultant palladium-on-charcoal catalyst is isolated by filtration and washed consecutively with water and ethanol, whereupon it is suspended in 800 parts of methanol and agitated thus under a hydrogen atmosphere at approximately 25° for 1 hour.

An intimate mixture of 58 parts of tryptamine and 70 parts of 3,4-dimethoxyphenyl-2-propanone is heated at 80–100° for 1 hour, following which it is dissolved in approximately 800 parts of methanol. This solution is combined with the methanol suspension of catalyst derived by the procedure of paragraph one in this example; and the resultant mixture is agitated under a hydrogen atmosphere for approximately 5 hours. The mixture is then filtered, and to the filtrate is added a solution of approximately 17 parts of oxalic acid in 100 parts of methanol. The crystalline precipitate thrown down is collected on a filter. This material is 3-{2-[2-(3,4-dimethoxyphenyl) - 1 - (methyl)ethylamino]ethyl} - indole oxalate, which melts at approximately 226° and has the formula

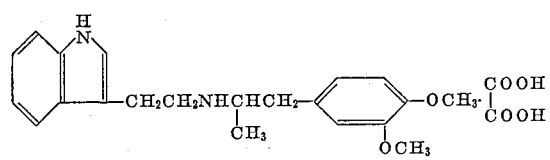

(B) *3 - {2 - [2 - (3,4 - dimethoxyphenyl) - 1 - (methyl)-ethylamino]ethyl}indole.*—A suspension of the oxalate of the foregoing part A of this example in dilute aqueous sodium hydroxide is extracted with ether. The ethereal extract is dried over potassium hydroxide and then stripped of solvent by distillation under reduced pressures. The residue is the free base, 3-{2-[2-(3,4-dimethoxyphenyl) - 1 - (methylethylamino]ethyl}indole.

(C) *3 - {2 - [2 - (3,4 - dimethoxyphenyl) - 1 - (methyl) - ethylamino]ethyl}indole hydrochloride.*—An ether solution of the free base of the preceding part B of this example is treated with a slight excess of hydrogen chloride dissolved in 2-propanol. The crystalline precipitate which forms is 3-{2-[2-(3,4-dimethoxyphenyl)-1-(methyl)-ethylamino]ethyl}indole hydrochloride, the melting point of which is approximately 184°. The product is isolated by filtration.

Example 2

(A) *3 - {2 - [2 - (3,4 - dihydroxyphenyl) - 1 - (methyl)ethylamino]ethyl}indole hydrochloride.*—An intimate mixture of 31 parts of 3-{2-[2-(3,4-dimethoxyphenyl)-1-(methyl)ethylamino]ethyl}indole and 105 parts of pyridine hydrochloride is heated in a nitrogen atmosphere for 4 hours at 190–210°. The reaction mixture is then cooled and mixed with sufficient chloroform to dissolve the pyridine hydrochloride which has not been lost by sublimation during the heating period. Under typical conditions, about 3000 parts of chloroform is employed. The chloroform phase is discarded and the oily supernatant layer taken up in about 30 parts of water. This solution is washed with ether and then treated with an excess of hydrochloric acid. Crystallization is induced, the crystalline product being filtered off and washed with a minimum quantity of water, and then with acetone. The product thus obtained is 3-{2-[2-(3,4-dihydroxyphenyl) - 1 - (methylethylamino]ethyl}indole hydrochloride, the melting point of which is approximately 242°. The product has the formula

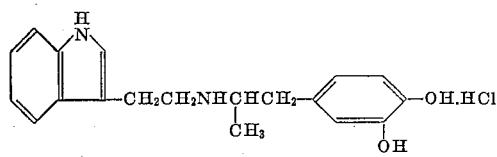

(B) *3 - {2 - [2 - (3,4 - dihydroxyphenyl) - 1 - (methyl)-ethylamino]ethyl}indole.*—A solution of the hydrochloride of the preceding part A of this example in aqueous methanol is added, with agitation, to an excess of sodium bicarbonate dissolved in water. Agitation is continued for about 30 minutes, after which the crystalline base which precipitates is filtered out and washed consecutively with water, propanol, and methanol. The 3 - {2 - [2 - (3,4 - dimethoxyphenyl( - 1 - (methyl)ethyl-amino]ethyl}indole thus obtained is a colorless product melting at approximately 191°.

*Example 3*

3 - {2 - [2 - (3,4 - dibenzyloxy) - 2 - hydroxy - 1- (methyl)ethylamino]ethyl}indole oxalate.—A solution of 120 parts of 1-(3,4-dibenzyloxyphenyl)-1-hydroxy-2-propanone and 53 parts of tryptamine in 240 parts of methanol is mixed with 1 part of platinum oxide and agitated under hydrogen at pressures of the order of 30–40 pounds per square inch at 25° for about 3 hours, 1 equivalent of hydrogen being absorbed in this time. The mixture is then filtered, and the filtrate is freed of solvent by distillation. To the residue is added 1 molar equivalent of oxalic acid dissolved in ethanol. The crystalline oxalate which forms is recovered from the mother liquors by filtration. The material thus isolated is 3-{2-[2-(3,4-dibenzyloxy)-2-hydroxy-1-(methyl)-ethylamino]ethyl}indole oxalate, of the formula

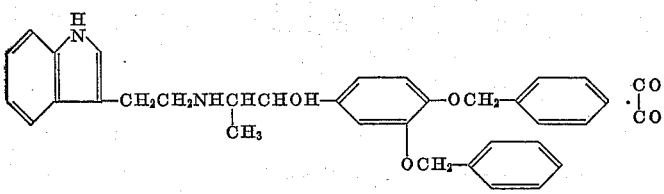

*Example 4*

3 - {2 - [2 - hydroxy - 2 - (3,4 - dihydroxyphenyl) - 1- (methyl)ethylamino]ethyl}indole oxalate.—A solution of 40 parts of the oxalate of the preceding Example 3 in 400 parts of methanol is hydrogenated at atmospheric pressure at 25° over 1 part of palladium-on-charcoal catalyst. The requisite 2 molecular equivalents of hydrogen are absorbed in 6 hours, at which point catalyst is removed by filtration and the filtrate freed of solvent by vacuum distillation. Addition of 1 molecular equivalent of oxalic acid dissolved in ethanol affords the desired 3 - {2 - [2 - hydroxy - 2 - (3,4 - dihydroxyphenyl)-1- (methyl)ethylamino]ethyl}indole oxalate of the formula

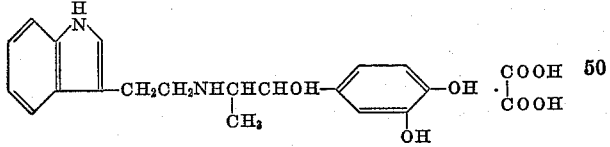

*Example 5*

(A) α-*Methyl-3-indoleethanol*.—To a solution of approximately 29 parts of methylmagnesium bromide in 150 parts of anhydrous ether, maintained with agitation at approximately 0°, there is added over a period of about 1 hour a solution of 24 parts of indole in 45 parts of anhydrous ether. After a further 45 minutes, a solution of 13 parts of propylene oxide in 55 parts of anhydrous benzene is introduced during 30 minutes. Throughout the foregoing operations and for an additional 2 hours, the reactants are maintained at temperatures of the order of 0–5° with agitation. Thereafter, the reaction mixture is allowed to warm to room temperatures and then distilled at a rate such that substantially all of the ether and benzene are removed during a period of about 5 hours. The residual mass is decomposed with ice water. Solid carbon dioxide is added to dissolve the magnesium, following which the mixture is extracted with several portions of ether. The ether extracts are washed with water, dried over anhydrous sodium sulfate, and distilled under reduced pressures to give a fraction boiling at 145°/0.15 mm., which is α-methyl-3-indoleethanol.

(B) *3-(2-bromopropyl)indole*.—A mixture of 42 parts of α-methyl-3-indoleethanol, 21 parts of phosphorus tribromide, and 1200 parts of chloroform is maintained in a nitrogen atmosphere at about 25° for 15 hours, after which the solvent is removed by distillation in vacuo. The non-volatile residue is 3-(2-bromopropyl)indole.

(C) 3-{2-[2-(3,4-dimethoxyphenyl)ethylamino]propyl} indole hydrochloride.—To a solution of approximately 32 parts of 3-(2-bromopropyl)indole in 350 parts of ether is added 45 parts of 3,4-dimethoxyphenethylamine. The resultant mixture is heated until the solvent is distilled off, following which it is maintained in the range 90–100° for an additional 2 hours. The mixture is then taken up in 750 parts of chloroform, and the resultant solution is washed with a total of 400 parts of water in 4 portions. (Unreacted 3,4-dimethoxyphenethylamine is recovered as the hydrobromide by evaporation of the aqueous washes.) The chloroform solution is freed of solvent by distillation and the residue is partitioned into a relatively soluble component and a relatively insoluble component by extracting it with approximately 200 parts of aqueous 5% hydrochloric acid. The relatively insoluble component is dissolved in a mixture of 500 parts of water and 400 parts of methanol, and this solution is washed with a total of 150 parts of chloroform in 5 equal portions. The aqueous phase is then heated under reduced pressures until substantially all of the methanol is distilled and the volume is reduced to about 15% of the original amount, whereupon the desired 3-{2-[2-(3,4-dimethoxyphenyl)ethylamino]propyl}indole hydrochloride crystallizes from the remaining liquor. The product is collected on a filter and washed with acetone. Further purification is achieved by recrystallization from dilute aqueous hydrochloric acid. The product is obtained thus as a hydrate melting at 125–128°, which is converted to the anhydrous form melting at 152–153° by drying in vacuo over phosphorus pentoxide at 110°. The product has the formula

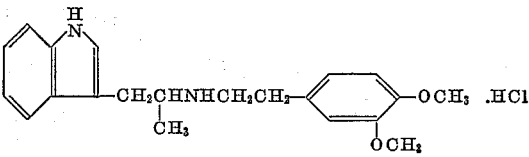

*Example 6*

3-{2-[2-(3,4-dihydroxyphenyl) ethylamino] propyl}-indole hydrochloride.—Treatment of 3-{2-[2-(3,4-dimethoxyphenyl)ethylamino]propyl}indole hydrochloride with pyridine hydrochloride in accordance with procedure detailed in Example 2A hereinbefore effects demethylation thereof and affords 3-{2-[2-(3,4-dihydroxyphenyl)ethylamino]propyl}indole hydrochloride, of the formula

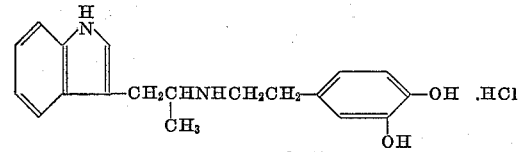

*Example 7*

3-{2-[2-hydroxy-2-(3,4 - dihydroxyphenyl) ethylamino] propyl}indole tartrate.—A mixture of approximately 52 parts of 1-(3-indolyl)-2-propanone and 51 parts of α,3,4-trihydroxyphenethylamine is dissolved in 600 parts of methanol. Approximately 1 part of platinum oxide is suspended in this solution, and the resultant mixture is agitated at 25° under hydrogen at pressures of the order of 30–40 pounds per square inch. Hydrogen absorption, rapid at first, becomes progressively slower, approximately 3 hours being required for the uptake of 1 molecular equivalent of the gas. At this point, catalyst is filtered off; and the filtrate is stripped of solvent by vacuum distillation at room temperatures. The residue is dissolved in 2-propanol and treated with 1 molar equivalent of tartaric acid. The acid addition salt thus formed is soluble in 2-propanol, wherefore ether is added to effect precipitation. The precipitate is recovered on a filter, washed with ether, and dried in vacuo over phosphorus pentoxide. This material is 3-{2-[2-hydroxy-2-(3,4-dihydroxyphenyl)ethylamino]propyl}indole tartrate, which is moderately hygroscopic, and melts undefinitely beginning at around 65°. The product has the formula

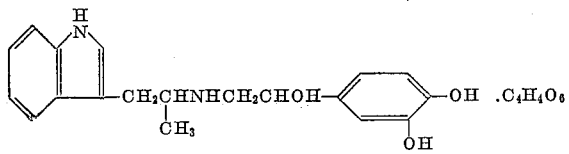

*Example 8*

*3 - {2 - [2-(3,4-dimethoxyphenyl) - 1 - (methyl)-ethylamino]propyl}indole hydrochloride.*—To a solution of 6 parts of 3-(2-bromopropyl)indole in 75 parts of ether is added 10 parts of 3,4-dimethoxy-α-methylphenethylamine. The resultant mixture is heated at a rate such that substantially all of the ether is removed by distillation during a 2-hour period, following which the residue is heated at 90–100° for an additional hour. The residue is then taken up in 750 parts of chloroform, and this solution is washed with a total of 300 parts of aqueous 50% methanol in 2 portions. (By evaporation of the methanolic wash water, unused 3,4-dimethoxy-α-methylphenethylamine is recovered as the hydrobromide.) The chloroform solution is stripped of solvent by distillation, and the residue is taken up in ether. Addition to this solution of a slight excess of hydrogen chloride dissolved in 2-propanol causes precipitation of a product which is fractionated into 2 components having greater and lesser degrees of solubility in water on extraction with about 100 parts thereof. The relatively insoluble component, which is customarily the principal fraction, is suspended in an excess of dilute aqueous sodium hydroxide; and the free base which is thrown down is extracted with several portions of benzene. The benzene extracts are combined and chromatographed on alumina, using benzene and acetone as developing solvents. 3-{2-[2-(3,4-dimethoxyphenyl)-1-(methyl)ethylamino]propyl}indole is eluted at a satisfactory rate with solutions of acetone in benzene containing about 20 to 50% (by volume) of acetone. The base appears as a principal weight peak in the elution curve, and the corresponding eluate residues obtained on evaporation of solvent are dissolved in ether and treated with a slight excess of hydrogen chloride in 2-propanol solution. There is obtained by this means the desired 3-{2-[2-(3,4 - dimethoxyphenyl)-1-(methyl)ethylamino]propyl} indole hydrochloride melting at 85–90°. After thorough drying, this melting point is increased to approximately 95° or higher. 3-{2-[2-(3,4-dimethoxyphenyl)-1-(methyl)ethylamino]propyl}indole hydrochloride has the formula

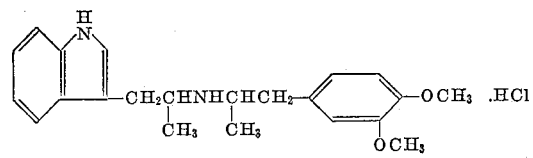

*Example 9*

*3 - {3 - [2 - (3,4 - dimethoxyphenyl)ethylamino]butyl} indole hydrochloride.*—An intimate mixture of approximately 54 parts of 3,4-dimethoxyphenethylamine and approximately 56 parts of 1-(3-indolyl)-3-butanone is heated at 90–100° for 20 minutes, following which the reaction mass is dissolved in approximately 2000 parts of methanol. This solution is decolorized with charcoal and then added to a pre-hydrogenated suspension of 3 parts of platinum oxide in 600 parts of methanol. The resulting mixture is agitated in a hydrogen atmosphere at 25° for about 4 hours, whereupon the catalyst is removed by filtration and the filtrate is stripped of solvent by distillation. The oil which remains is dissolved in 3600 parts of anhydrous ether. The ethereal solution is mixed with 50 parts of carbon disulfide and allowed to stand for around 20 hours at room temperatures. The gummy dithiocarbamate which precipitates is collected on a filter and dissolved in 2-propanol. To this solution, an excess of hydrogen chloride in 2-propanol is added, followed by sufficient anhydrous ether to induce precipitation. The precipitate so produced is collected on a filter and washed consecutively with ether and dilute aqueous hydrochloric acid. Recrystallization from water containing a small amount of methanol affords pure 3-{3-[2-(3,4-dimethoxyphenyl)ethylamino]butyl}indole hydrochloride, melting at 168–170°, and having the formula

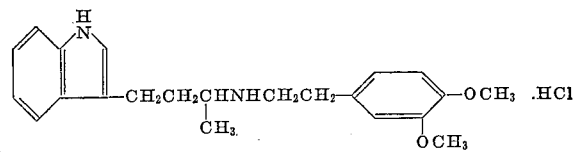

*Example 10*

(A) *3 - {3 - [2 - (p-hydroxyphenyl)ethylamino]butyl} indole.*—A solution of 22 parts of tyramine and 32 parts of 1-(3-indolyl)-3-butanone in 960 parts of methanol is continuously mixed with 1 part of platinum oxide under a hydrogen atmosphere during 40 hours at room temperatures. Catalyst is then removed by filtration, and solvent is stripped by vacuum distillation. The crystalline residue, washed first with ether and then with 2-propanol, is 3 - {3 - [2 - (p-hydroxyphenyl)ethylamino]butyl}indole, melting in the range 175–200°. The product has the formula

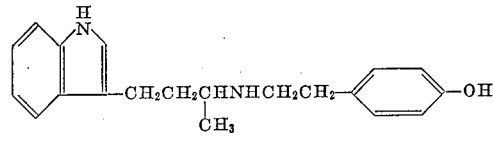

(B) *3 - {3 - [2 - (p-hydroxyphenyl)ethylamino]butyl} indole hydrochloride.*—A solution of the base of the preceding part A of this example in 2-propanol is precipitated with a slight excess of 2-propanolic hydrogen chloride. This precipitate, recovered on a filter and recrystallized from dilute aqueous hydrochloric acid, melts at approximately 203°. The material thus obtained is 3 - {3 - [2 - (p-hydroxyphenyl)ethylamino]butyl}indole hydrochloride.

*Example 11*

(A) *5 - methoxy - 3 - {2 - [2-(3,4 - dimethoxyphenyl)-ethylamino]ethyl}indole.*—A reaction mixture prepared from approximately 19 parts of 3,4 dimethoxyphenylacetaldehyde, 19 parts of 5-methoxytryptamine, 1 part of platinum oxide catalyst transferred under anhydrous ethanol, and 1200 parts of methanol is agitated in contact with a hydrogen atmosphere for 2 hours at approximately 25°. The catalyst is removed by filtration, and the filtrate is stripped of solvent by distillation in vacuo.

The residue is 5-methoxy-3-{2-[2-(3,4-dimethoxyphenyl)-ethylamino]ethyl}indole of the formula

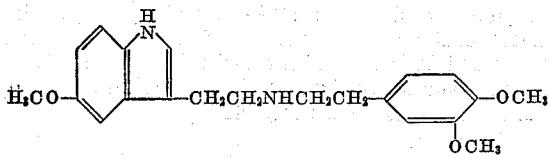

(B) *5 - methoxy - 3 - {2 - [2 - (3,4 - dimethoxyphenyl)-ethylamino]ethyl}indole hydrobromide.*—A solution of the free base of the foregoing part A of this example in ether is treated with a slight excess of hydrogen bromide in 2-propanol, and the precipitated product is collected and washed with ether. This product is 5-methoxy-3-{2-[2-(3,4-dimethoxyphenyl)ethylamino]ethyl}indole hydrobromide.

(C) *5 - methoxy - 3 - {2 - [2 - (3,4 - dimethoxyphenyl)ethylamino]ethyl}indole citrate.*—The citric acid salt of the base of the foregoing part A of this example is obtained by treating a solution of 7 parts of the free base in a minimum quantity of methanol with a solution of approximately 4 parts of citric acid in methanol, and evaporating the resultant mixture to a small volume. The precipitate thereupon thrown down is 5-methoxy-3-{2-[2-(3,4-dimethoxyphenyl)ethylamino]ethyl}indole citrate.

Example 12

(A) *6 - methoxy - 3 - {2 - [2 - (3,4 - dimethoxyphenyl)-1-(methyl)ethylamino]ethyl}indole.*—A mixture of 60 parts of 3,4-dimethoxyphenyl-2-propanone, 57 parts of 6-methoxytryptamine, 3 parts of platinum oxide catalyst dispersed in 160 parts of anhydrous ethanol, and 1600 parts of methanol is agitated in contact with a hydrogen atmosphere for approximately 3 hours at room temperatures. The catalyst is removed by filtration, and the filtrate is stripped of solvent by vacuum distillation. The residue thus obtained is 6-methoxy-3-{2-[2-(3,4-dimethoxyphenyl)-1-(methyl)ethylamino]ethyl}indole, of the formula

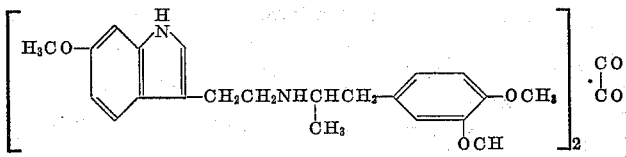

(B) *6 - methoxy - 3 - {2 - [2 - (3,4 - dimethoxyphenyl)-1-(methyl)ethylamino]ethyl}indole hydrochloride.*—A solution of the free base of the foregoing part A of this example in ether is treated with an excess of hydrogen chloride in 2-propanol. The product which precipitates is collected on a filter and washed with ether. This product is the water-soluble, hygroscopic hydrochloride of 6 - methoxy - 3{2 - [2 - (3,4 - dimethoxyphenyl)-1-(methyl)ethylamino]ethyl}indole.

(C) *6 - methoxy - 3 - {2 - [2 - (3,4 - dimethoxyphenyl)-1-(methyl)ethylamino]ethyl}indole oxalate.*—A solution of 60 parts of the free base of the preceding part A of this example in 5700 parts of ether is mixed with 16 parts of oxalic acid, and the insoluble product thrown down is collected and washed with ether. This product is suspended for several minutes in warm acetone, recovered by filtration, and purified by recrystallization from methanol. There is obtained by this means 6-methoxy-3-{2 - [2 - (3,4 - dimethoxyphenyl) - 1 - (methyl)ethylamino]ethyl}indole oxalate, which melts at about 203–204°.

Example 13

*5 - ethoxy - 3 - {2 - [2 - (3,4 - dimethoxyphenyl) - 1-(methyl)ethylamino]ethyl}indole.*—Using the procedure of Example 12(A) hereinabove, but substituting 61 parts of 5-ethoxytryptamine for the 57 parts of 6-methoxytryptamine called for therein, there is obtained 5-ethoxy-3 - {2 - [2 - (3,4 - dimethoxyphenyl) - 1 - (methyl)ethylamino]ethyl}indole, which has the formula

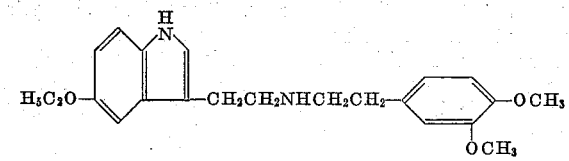

Example 14

(A) *5 - benzyloxy - 3 - {2 - [2 - (3,4 - dimethoxyphenyl)-1-(methyl)ethylamino]ethyl}indole oxalate.*—A mixture of 45 parts of 5-benzyloxytryptamine, 34 parts of 3,4-dimethoxyphenyl-2-propanone, 2 parts of platinum oxide catalyst, and 2000 parts of methanol is agitated in contact with a hydrogen atmosphere for 1 hour at about 25°. An additional 20 parts of 3,4-dimethoxyphenyl-2-propone is added, and hydrogenation is continued for an additional hour, after which the catalyst is removed by filtration and the filtrate is treated with approximately 8 parts of oxalic acid. Solvent is removed by vacuum distillation, and the crystalline residue is washed with ether and then recrystallized from methanol. The product thus obtained is 5-benzyloxy-3-{2-[2-(3,4-dimethoxyphenyl) - 1 - (methyl)ethylamino]ethyl}indole oxalate, melting at approximately 179–180°, and having the formula

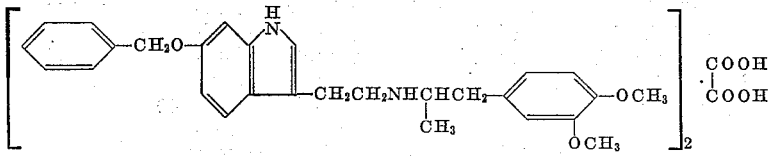

(B) *5 - benzyloxy - 3-{2-[2-(3,4-dimethoxyphenyl)-1-(methyl)ethylamino]ethyl}indole.*—A suspension of the oxalate of the foregoing part A of this example in dilute aqueous sodium hydroxide is extracted with ether, and the ethereal solution is washed with water and stripped of solvent by distillation under reduced pressures. The residue is 5-benzyloxy-3-{2-[2-(3,4-dimethoxyphenyl)-1-(methyl)ethylamino]ethyl}indole.

(C) *5 - benzyloxy - 3-{2-[2-(3,4-dimethoxyphenyl)-1-(methyl)ethylamino]ethyl}indole hydrochloride.*—A solution of 150 parts of the free base of the foregoing part B of this example in anhydrous ether is treated with 13 parts of hydrogen chloride dissolved in 2-propanol. The crystalline hydrochloride which separates melts at approximately 167–168°. This product is 5-benzyloxy-3-{2 - [2 - (3,4-dimethoxyphenyl)-1-(methyl)ethylamino]-ethyl}indole hydrochloride.

Example 15

(A) *5 - hydroxy - 3-{2-[2-(3,4-dimethoxyphenyl)-1-(methyl)ethylamino]ethyl}indole oxalate.*—A hydrogenation catalyst is prepared by suspending 6 parts of activated charcoal—which has previously been digested in dilute nitric acid and subsequently washed consecutively with water and ethanol—in a solution of 2 parts of palladium chloride in 1000 parts of water containing a small amount of hydrochloric acid, and shaking the resulting suspension in contact with a hydrogen atmosphere at room temperatures until hydrogenation is complete. The palladium-on-charcoal catalyst is recovered by filtration and washed consecutively with water and ethanol, following which it is suspended in 2000 parts of methanol. This suspension is agitated in contact with a hydrogen atmosphere at room temperatures for 15 minutes, after which there is added 20 parts of 5-benzyloxy-3-{2-[2-(3,4 - dimethoxyphenyl)-1-(methyl)ethylamino]ethyl}indole and 2 parts of oxalic acid. The mixture is again agitated in contact with a hydrogen atmosphere for around 15 hours, after which the catalyst is separated by filtration and the filtrate stripped of solvent by distillation at pressures in the range 20–30 mm. The crystalline residue is stirred with ethanol and collected on a filter. The product thus obtained is 5-hydroxy-3-{2-[2-(3,4-dimethoxyphenyl) - 1-(methyl)ethylamino]ethyl}indole oxalate, which melts at approximately 194°. The product has the formula

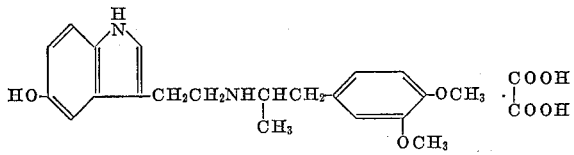

(B) 5 - hydroxy - 3-{2-[2-(3,4-dimethoxyphenyl)-1-(methyl)ethylamino]ethyl}indole.—A suspension of the oxalate of the foregoing part A of this example in warm aqueous sodium bicarbonate is extracted with benzene, and the benzene solution is thereupon washed with water and stripped of solvent by vacuum distillation. The material which remains is 5-hydroxy-3-{2-[2-(3,4-dimethoxyphenyl)-1-(methyl)ethylamino]ethyl}indole.

(C) 5 - hydroxy - 3-{2-[2-(3,4-dimethoxyphenyl)-1-(methyl)ethylamino]ethyl}indole hydrochloride.—A solution of the free base of the foregoing part B of this example in a minimum quantity of 2-propanol is treated with slightly more than 1 equivalent of hydrogen chloride in 2-propanol. When separation of the precipitate which appears is complete, the mixture is filtered; and the product thus removed is purified by recrystallization from ethanol. In this manner there is obtained 5-hydroxy-3 - {2-[2-(3,4-dimethoxyphenyl)-1-(methyl)ethylamino]ethyl}indole hydrochloride, which melts at approximately 227°.

*Example 16*

5 - hydroxy - 3 - {2 - [2 - (3,4-dihydroxyphenyl)-1-(methyl)ethylamino]ethyl}indole hydrochloride.—Substitution of 5 - hydroxy-3-{2-[2-(3,4-dimethoxyphenyl)-1-(methyl)ethylamino]ethyl}indole for the 3-{2-[2-(3,4-dimethoxyphenyl) - 1 - (methyl)ethylamino]ethyl}indole called for in the procedure of Example 2(A) affords 5-hydroxy - 3 - {2-[2-(3,4-dihydroxyphenyl)-1-(methyl) ethylamino]ethyl}indole hydrochloride, which has the formula

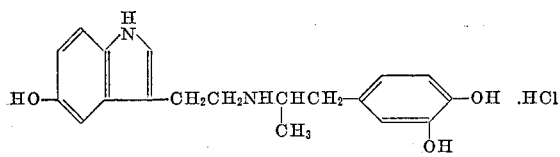

What is claimed is:
1. A compound of the formula

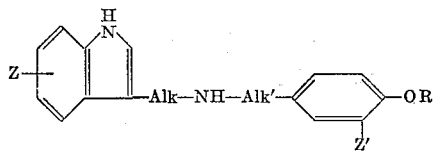

wherein Z and Z′ are selected from the group consisting of hydrogen and hydroxy, lower alkoxy, and benzyloxy radicals; Alk is an alkylene radical containing more than 1 and fewer than 5 carbon atoms; Alk′ is selected from the group consisting of alkylene and hydroxyalkylene radicals containing more than 1 and fewer than 4 carbon atoms; and R is selected from the group consisting of hydrogen and lower alkyl and benzyl radicals.

2. A compound of the formula

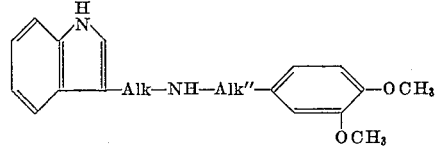

wherein Alk is an alkylene radical containing more than 1 and fewer than 5 carbon atoms and Alk″ is an alkylene radical containing more than 1 and fewer than 4 carbon atoms.

3. 3-{2-[2 - (3,4 - dimethoxyphenyl)-1-(methyl)ethylamino]ethyl}indole.

4. A compound of the formula

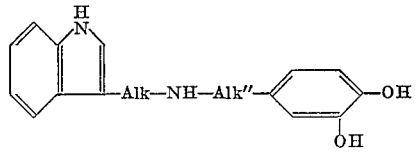

wherein Alk is an alkylene radical containing more than 1 and fewer than 5 carbon atoms and Alk″ is an alkylene radical containing more than 1 and fewer than 4 carbon atoms.

5. 3 - {2 - [2 - (3,4 - dihydroxyphenyl) - 1 - (methyl)-ethylamino]ethyl}indole.

6. A compound of the formula

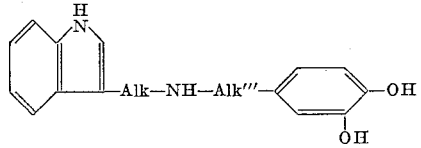

wherein Alk is an alkylene radical containing more than 1 and fewer than 5 carbon atoms and Alk‴ is a hydroxyalkylene radical containing more than 4 carbon atoms.

7. 3 - {3 - [2 - (p - hydroxyphenyl)ethylamino]butyl}-indole.

8. A compound of the formula

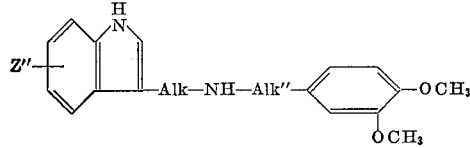

wherein Z″ is a lower alkoxy radical, Alk is an alkylene radical containing more than 1 and fewer than 5 carbon atoms, and Alk″ is an alkylene radical containing more than 1 and fewer than 4 carbon atoms.

9. 5 - benzyloxy - 3 - {2 - [2 - (3,4 - dimethoxyphenyl)-1-(methyl)ethylamino]ethyl}indole.

References Cited in the file of this patent

UNITED STATES PATENTS

| | | |
|---|---|---|
| 2,708,197 | Speeter | May 10, 1955 |
| 2,821,532 | Anthony et al. | Jan. 28, 1958 |
| 2,825,734 | Speeter | Mar. 4, 1958 |

OTHER REFERENCES

Brehm et al.: Jour. Org. Chem., vol. 15, p. 686 (1950).
Boyd et al.: Biochem Journal, vol. 29, p. 556 (1935).

UNITED STATES PATENT OFFICE

CERTIFICATE OF CORRECTION atent No. 2,908,691  October 13, 1959

Richard A. Robinson

It is hereby certified that error appears in the above numbered patnt requiring correction and that the said Letters Patent should read as orrected below.

Column 12, line 46, after "than" insert -- 1 and fewer han --.

Signed and sealed this 19th day of December 1961.

SEAL)
ttest:

RNEST W. SWIDER  
ttesting Officer

DAVID L. LADD  
Commissioner of Patents  
USCOMM-DC